United States Patent [19]

Clawson

[11] 4,184,239
[45] Jan. 22, 1980

[54] METHOD OF WORKING AN ADJUSTABLE SPRINKLER HEAD

[76] Inventor: Roger B. Clawson, 1752 Joel Way, Los Altos, Calif. 94022

[21] Appl. No.: 885,179

[22] Filed: Mar. 10, 1978

Related U.S. Application Data

[62] Division of Ser. No. 776,640, Mar. 11, 1976, Pat. No. 4,154,404.

[51] Int. Cl.² .......................... B23P 15/00; B05B 1/02
[52] U.S. Cl. .................................................. 29/157 C
[58] Field of Search .............. 29/157 C; 239/563, 562, 239/DIG. 1, 568, 597; 113/116 DD, 116 EE

[56] References Cited

U.S. PATENT DOCUMENTS

| | | | |
|---|---|---|---|
| 859,701 | 7/1907 | Speakman | 239/562 |
| 1,078,687 | 11/1913 | Lemale | 239/563 |
| 1,673,511 | 6/1928 | Hosford | 239/562 |
| 2,594,243 | 4/1952 | Winkler | 239/563 |
| 2,731,294 | 1/1956 | Rothweiler | 239/DIG. 1 |
| 2,943,798 | 7/1960 | Rienks | 239/DIG. 1 |
| 3,269,666 | 8/1966 | DeLeeuw | 239/568 |
| 3,546,883 | 12/1970 | Munding | 29/157 C |
| 3,623,437 | 11/1971 | Lusser | 239/597 |
| 3,716,192 | 2/1973 | Hunter | 239/568 |
| 3,815,832 | 6/1974 | Floyd | 239/563 |

Primary Examiner—Daniel C. Crane
Attorney, Agent, or Firm—Phillips, Moore, Weissenberger, Lempio & Majestic

[57] ABSTRACT

A simple, inexpensive sprinkler head is disclosed which may be adjusted to discharge a fluid in a full circular pattern of variable radius or in a variable size segment of such circular pattern of variable radius. The structure of the sprinkler head, which includes a short tubular body having an array of apertures through the wall thereof forming a closed elipse is described, together with a valve means for adjustment of the radius of the circular pattern of fluid discharge and a movable diaphragm means for adjustment of the size of the segment of the circular pattern in which fluid is discharged. The method of making such structure, including the fabrication of the tubular body of such structure in two parts by casting or molding techniques, is disclosed.

3 Claims, 5 Drawing Figures

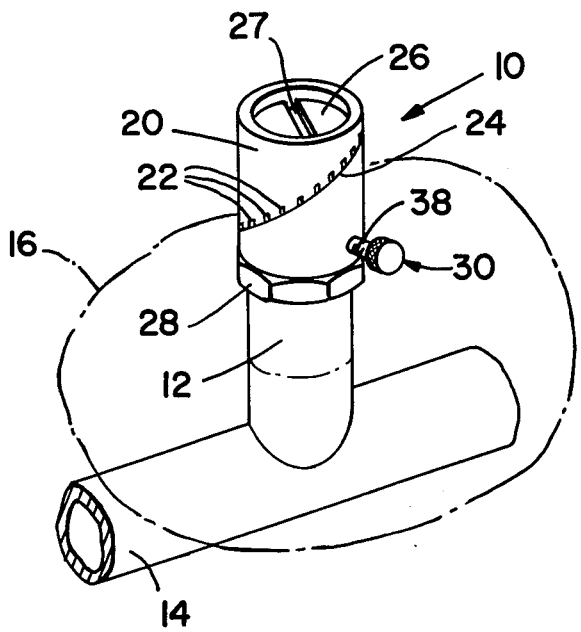
FIG_1
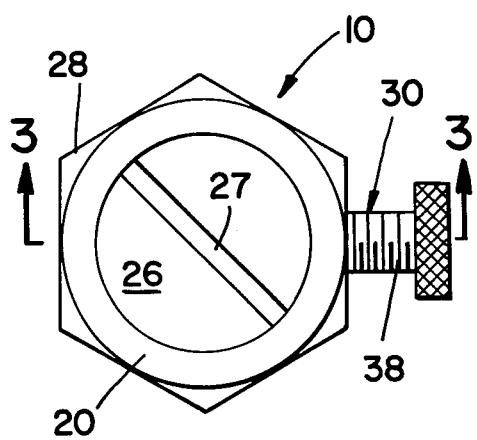
FIG_2
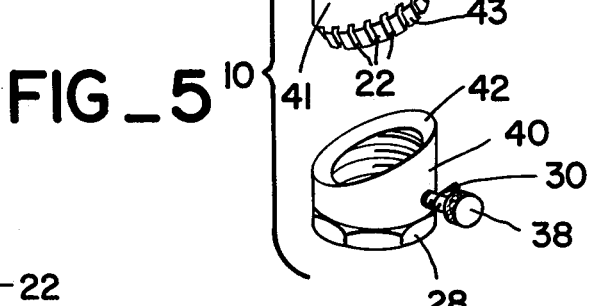
FIG_5
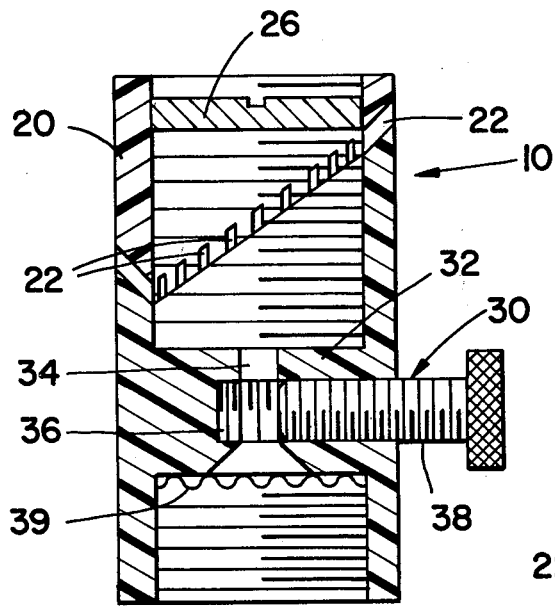
FIG_3
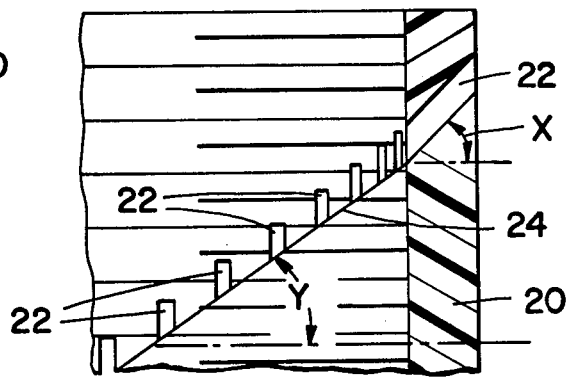
FIG_4

METHOD OF WORKING AN ADJUSTABLE SPRINKLER HEAD

This a division of Ser. No. 776,640, filed Mar. 11, 1976, now U.S. Pat. No. 4,154,404.

BACKGROUND OF THE INVENTION

This invention relates to sprinkler heads for discharging fluids in a circular pattern of variable diameter or in a variable size segment of such circular pattern and more particularly to an improved structure for such a sprinkler head which structure has reduced size and is simple and inexpensive to fabricate.

By way of example, the sprinkler head of this invention is particularly suitable for use in permanently installed sprinkler systems for lawns and gardens which are widely used to provide efficient watering of grass, plants and trees. Such sprinkler systems usually include generally horizontal pipes buried in the ground with vertical pipes or risers extending to the surface of the ground at spaced points along the buried pipes and with sprinkler heads on the free ends of the risers to spray or sprinkle water issuing from the risers under pressure over a predetermined area.

The predetermined area covered by such sprinkler head is inherently circular and the distribution of the water within such area tends to be annular. Thus, the sprinkler heads are usually spaced from each other to cover overlapping areas in an attempt to provide an even distribution of water over the area to be covered. However, most lawns and gardens have rectilinear boundaries defining areas that are not circular but have corners and narrow extensions.

Thus, in the prior art, specialized sprinkler heads have been provided, each of which is designed to distribute water over one of a given number of different segments of a circular area. For example, sprinkler heads designed to distribute water over a ¼, ⅓, ½, ⅔ or ¾ segments of a circle are common. Thus, a total of six or more different sprinkler heads were sometimes required in a given sprinkler system to provide satisfactory water distribution over an irregular area.

It has been proposed in the prior art to make an adjustable sprinkler head capable of being adjusted to distribute water over a selected segment of a circular area. However, such structures have either been excessively large in their dimensions or too complicated and expensive in their construction for universal use particularly in lawn and garden sprinkling systems.

It is the primary object of this invention to provide a single adjustable sprinkler head structure which is not only small enough but also simple and inexpensive enough to be used universally throughout a lawn sprinkling system requiring a number of sprinkler heads certain of which must cover various segments of circular areas and others of which must cover full circular areas.

SUMMARY OF THE INVENTION

Briefly, a sprinkler head according to the teaching of this invention comprises a tubular body having a given axis and means for introducing fluid under pressure into one end thereof. The tubular body has an array of a plurality of spaced apertures through the wall thereof intermediate its ends which array of apertures defines a plane extending at an angle to the axis of the tubular body and forms a closed elipse about the periphery of the tubular body. The sprinkler head also includes a diaphragm means within the tubular body which is selectively movable along the axis of the tubular body and yet is adapted to close the tubular body to the passage of fluid therethrough. Thus the position of the diaphragm means along the axis of the tubular body will determine which of the holes of the array of holes are exposed to the fluid under pressure which is introduced into one end of the tubular body. The sprinkler head preferably includes means for regulating the flow of fluid into the tubular body. The tubular body is preferably cast in two parts adapted to mate with each other in a plane extending transversely to the axis of the tubular member and at an angle thereto. The mating end of one part of the tubular member is provided with an internal bevel extending at an angle of about 45° to the axis of the tubular member and the mating end of the other part of the tubular member is provided with an external bevel extending at the same angle. At least one of the beveled surfaces at the mating ends of the two parts of the tubular member is provided with an array of spaced grooves extending radially of the tubular member. The two parts of the tubular member are internally threaded and the mating ends thereof are bonded to each other as by sonic welding whereby the radial grooves in the beveled surface provide the closed elliptical array of apertures through the wall of the tubular member.

BRIEF DESCRIPTION OF THE DRAWING

This invention will be more fully understood from a reading of the following detailed description of a preferred embodiment thereof in conjunction with the appended drawings wherein:

FIG. 1 is a perspective view showing a fragment of the buried pipe of a lawn sprinkling system together with a riser extending vertically upward therefrom having a sprinkler head according to the preferred embodiment of this invention mounted on the free end thereof.

FIG. 2 is an enlarged top plan view of the sprinkler head of FIG. 1.

FIG. 3 is a cross-sectional view in elevation taken along line 3—3 of FIG. 2.

FIG. 4 is an enlarged fragmentary view in cross-section of a portion of FIG. 3; and FIG. 5 is an exploded view illustrating the two-part fabrication of the tubular member of the sprinkler head according to this invention.

DETAILED DESCRIPTION OF PREFERRED EMBODIMENT

A sprinkler head 10 made in accordance with the teaching of this invention is shown in FIG. 1 mounted for normal operation on the free end of a riser pipe 12 extending vertically from a buried supply line 14 of a lawn sprinkling system, by way of example. The surface of the ground or lawn is indicated in phantom at 16 and it will be understood that it is important according to the teaching of this invention to minimize the necessary projection of the sprinkler head 10 above the surface 16 where the sprinkler head is to be positioned in the middle of a lawn. This consideration may be of less importance where the sprinkler head 10 is used to water shrubs, trees, or a garden at the end of a riser 12 extending for a substantial distance above the surface 16. In any event, it is desirable to minimize the amount of material used in making the sprinkler head 10 and thus it is a basic consideration according to the teaching of this invention to provide a sprinkler head 10 having an axial length approaching a minimum.

In its simplest form, the sprinkler head according to the teaching of this invention, comprises a tubular body 20 in the form of a right circular cylinder of given wall thickness. A plurality of spaced apertures 22 are provided through the wall of the tubular member 20 and such apertures 22 are arranged in a closed elliptical array 24 defining a plane which extends at an angle to the axis of the tubular member 20. A movable diaphragm 26 is positioned within the tubular member for movement along the axis of the tubular member 20 and one end of the tubular member 20 is provided with attachment means for mounting the sprinkler head 10 on the free end of the riser pipe 12 in communication therewith to enable the introduction of water under pressure into one end of the tubular member 20.

It will be seen that by adjusting the position of the diaphragm 26 along the axis of the tubular member 20, the number of apertures 22 of the array 24 which are exposed to water under pressure communicated into the end of the tubular member 20 from the riser pipe 12 can be selected. When the diaphragm 26 is at one extreme of its travel, all of the apertures 22 will be exposed to water under pressure within the tubular member 20 and water will be discharged from the sprinkler head 10 in a full circular pattern. When the diaphragm 26 is at the opposite extreme of its travel along the axis of the tubular member 20, none of the apertures 22 will be exposed to water under pressure within the tubular member 20 and no water will be discharged from the sprinkler head 10. The positioning of the diaphragm 26 at a point between its opposite extremes will expose a certain number of the apertures 22 to water under pressure within the tubular member 20 and water will be discharged from the sprinkler head 10 in a segment of the full circular pattern, the size of which will depend upon the number of apertures through which water is discharged.

In the preferred embodiment of this invention, the apertures 22 are spaced from each other so that their centers when projected on a plane perpendicular to the axis of the tubular member 20 will be equally spaced from each other. Also, according to the preferred embodiment of this invention, the internal surface of the tubular member 20 is threaded and the diaphragm 26 comprises a simple externally threaded plug adapted to be threadedly received within the tubular member 20. The diaphragm plug 26 is preferably provided with an externally exposed kerf 27 which may be engaged by a screwdriver or similar tool for ease of adjustment of the diaphragm 26 along the axis of the tubular member 20.

The internal threads in the tubular member 20 will also provide for ease of attachment of the sprinkler head 10 to the end of a conventional riser pipe 12 which includes external threads. Thus, the tubular body 20 of the sprinkler head 10 may have an internal diameter adapted to threadedly receive the free end of the riser pipe 12 and the means 28 for attaching the sprinkler head 10 to the riser pipe 12 may simply comprise a hexagonal external portion, as shown in the drawing, whereby the internal threads of the tubular member 20 may be engaged with the external threads on the riser pipe 12.

In the preferred embodiment of this invention, the sprinkler head 10 is provided with pressure valve means 30 interposed between the attachment means 26 and the array 24 of apertures 22. As best shown in FIG. 3, such pressure valve means 30 may comprise a partition 32 extending transversely of the axis of the tubular body 20 and having an axially extending hole 34 therethrough. The axially extending hole 34 is intersected by a threaded passageway 36 extending radially of the tubular member and a set screw 38 is threadedly received in the threaded passageway 36. The threaded passageway 36 should have a diameter larger than the diameter of the axially extending hole 34 and thus when the set screw 38 is fully received within the threaded passageway 36, the axially extending hole 34 will be completely closed and no water will be communicated from the riser pipe 12 to the array 24 of apertures 22. Adjustment of the set screw 38 will regulate the area of the axially extending hole 34 which is available for the passage of water and thus it will be possible to regulate the dynamic pressure of the water at the apertures 22 which are exposed by any given setting of the diaphragm 26 so that the radius of the circular pattern or segment thereof in which the water is discharged may be easily and quickly adjusted.

As shown in FIG. 3, the axially extending hole 34 may be countersunk on the side of the partition 36 facing the riser pipe 12, if desired. Also, a screen or mesh type filter 39 may be provided within the tubular member 20 in abutment with the partition 32 on the side thereof facing the riser pipe 12 in order to filter out particulate matter which might tend to clog the apertures 22. It will be seen that the sprinkler head 10 may be easily removed from the riser pipe 12 to enable cleaning of the screen or filter 39.

According to the preferred embodiment of this invention and as best shown in FIG. 4, the apertures 22 of the eliptical array 24 extend through the wall of the tubular member 20 at a 45° angle (shown at X in FIG. 4) with respect to planes perpendicular to the axis of the tubular member 20 and passing through the lowest point of the apertures 22. It has been found that this angle provides the optimum trajectory for water discharged through the apertures 22. The apertures 22 may have any desired cross-section, however, a semicircular or trapezoidal cross-section, as shown in the drawing, is preferred for reasons which will be more fully discussed hereinbelow.

According to the embodiment of this invention shown in the drawing, the array 24 of apertures 22 define a plane which extends at an angle Y (see FIG. 4) with respect to a plane perpendicular to the axis of the tubular member 20. According to the teaching of this invention, the angle Y should not be greater than about 40° nor less than about 20°. If the angle Y is greater than 40°, it will tend to add unnecessarily to the length of the tubular member 20 and if the angle Y is less than about 20°, it will make it unnecessarily difficult to control the number of apertures through which water is distributed. In other words, if the angle Y is less than 20°, the precision with which the diaphragm 26 must be adjusted in order to control the distribution of water will be unnecessarily high, requiring a finer threading of the tubular member and diaphragm 26 and added expense in fabrication.

Referring to FIG. 5, the preferred method of fabricating the sprinkler head 10, according to the teaching of this invention, is to cast the tubular member 20 in two parts 40 and 41 as shown. The sprinkler head 10 may be cast in an appropriate metal or preferably plastic and the first part 40 may be cast as a double cup to provide the partition 32. The hole 32 and passageway 36 may be cast in the part 40 as can the hexagonal attachment means 28. The internal threads of the double cup member, as well as the internal threads of the passageway 36, are preferably formed after the part 40 is cast.

As shown in FIG. 5, the end of the part 40 remote from the attachment means 28 terminates in a plane extending at the angle Y discussed hereinabove and is provided with an internal bevel 42 extending at the 45° angle X as discussed hereinabove in connection with the apertures 22. Similarly, the part 41 of the tubular member 20 may be cast as a simple tubular section terminating at one end in a plane extending at the angle Y and being provided with an external bevel 43 of 45° whereby the beveled ends of the parts 40 and 41 will mate with each other.

As shown in the drawing, the beveled surface of the part 41 is cast with a plurality of rectangular grooves therein to provide the apertures 22 when the parts 40 and 41 of the tubular member 20 are attached to each other in mating relation. The grooves which form the apertures 22 need not be rectangular but may have a semi-circular cross-section or any other cross-section which may be easily cast. Furthermore, the grooves need not be cast in the bevel 43 of the part 41 but could be cast in the bevel 42 of the part 40 or in the bevels 42 and 43 of both parts.

The two parts 40 and 41 of the tubular member 20 are then rigidly fixed to each other with their beveled surfaces 42 and 43 in mating relation as, for example, by means of sonic welding. Where the parts 40 and 41 are made of plastic, it would be possible to glue them together and where they are made of metal, welding or brazing techniques could be used.

According to the preferred method of fabrication, the tubular body would be internally threaded after the two parts 40 and 41 are rigidly fixed to each other. The diaphragm or plug 26 and the set screw 38 may be made of metal or plastic by any conventional fabrication technique in the appropriate size and with the appropriate threads for use in the sprinkler head 10.

From the above, it will be seen that a simple and inexpensive sprinkler head is provided according to this invention which is adapted for usage at any point in a sprinkler system and yet will enable precise and efficient distribution of water or other fluids therefrom through simple and convenient adjustment thereof. Obvious changes could be made in the preferred embodiment of this invention as shown in the drawing, some of which are specifically mentioned hereinabove. Other changes include, for example, the substitution of a set screw requiring a screwdriver or other tool for adjustment thereof and diaphragms of more complex shape than the simple planar plug shown in the drawing. Thus, the subject matter for which protection is sought is set forth in the following claims.

I claim:

1. The method of making a sprinkler head comprising the steps of:
   (a) fabricating a first tubular body portion having a given axis and given internal and external cross-sectional dimensions with means for introducing fluid under pressure into one end thereof and its other end terminating in a plane extending at a given angle to said given axis;
   (b) fabricating a second tubular body portion having a given axis and the same given internal and external cross-sectional dimensions as said first tubular body portion with one end thereof terminating in a plane extending at said given angle to said given axis;
   (c) providing a plurality of radially extending grooves in one of said other end of said first tubular body portion and said one end of said second tubular body portion;
   (d) welding said other end of said first tubular body portion to said one end of said second tubular body portion whereby a tubular body is formed having said given axis and said grooves provide an array of a plurality of spaced apertures through the wall thereof defining a plane extending at said given angle to said given axis;
   (e) fabricating a diaphragm having external cross-sectional dimensions corresponding to said given internal cross-sectional dimensions of said tubular body; and
   (f) mounting said diaphragm within said tubular body for selective movement along said given axis from one of said first and said second tubular body portions thereof to the other.

2. The method of making a sprinkler head as claimed in claim 1 including the step of providing an internal bevel at said other end of said first tubular body portion and providing an external bevel at said one end of said second tubular body portion.

3. The method of making a sprinkler head as claimed in claim 1 wherein said step of fabricating a first tubular body portion with means for introducing fluid under pressure into one end thereof includes the steps of forming said first tubular body portion with a partition extending transversely of said given axis therewithin intermediate the ends thereof and forming a hole through said partition.

* * * * *

UNITED STATES PATENT AND TRADEMARK OFFICE
CERTIFICATE OF CORRECTION

PATENT NO. : 4,184,239
DATED : January 22, 1980
INVENTOR(S) : ROGER B. CLAWSON

It is certified that error appears in the above—identified patent and that said Letters Patent is hereby corrected as shown below:

Title page, Item [54] - The title should read --METHOD OF MAKING AN ADJUSTABLE SPRINKLER HEAD--.

Title page, Item [62] - Change "1976" to --1977--.

Column 1, line 2 - Change "WORKING" to --MAKING--.

Column 1, line 6 - Change "1976" to --1977--.

Column 3, line 67 - Change reference numeral "26" to --28--.

Signed and Sealed this

Fifth Day of August 1980

[SEAL]

Attest:

SIDNEY A. DIAMOND

Attesting Officer

Commissioner of Patents and Trademarks